A. C. PRATT.
MILEAGE INDICATOR FOR TIRES.
APPLICATION FILED DEC. 26, 1914.
1,167,836.
Patented Jan. 11, 1916.
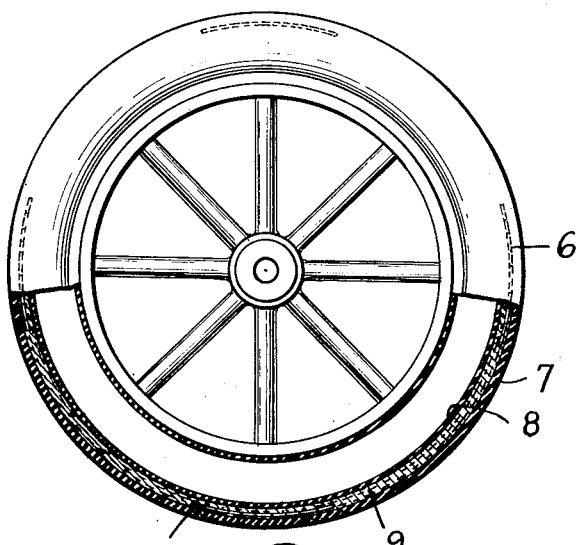
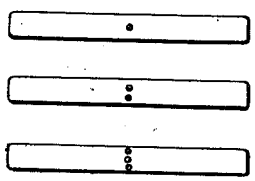
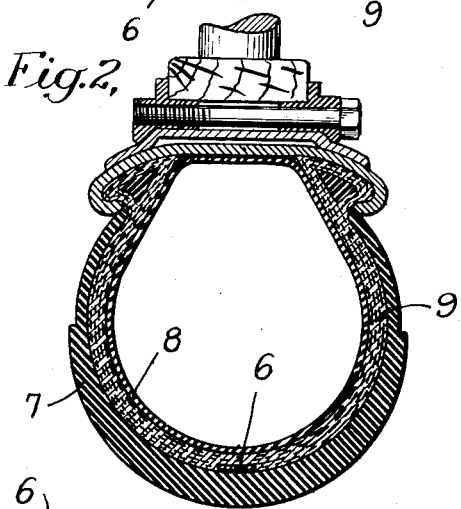
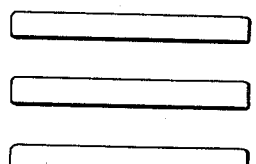
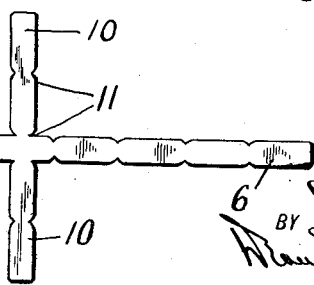
WITNESSES
K. Schulz
L. Bates
INVENTOR
A. C. Pratt,
BY
Alan S. Edwards
ATTORNEY

UNITED STATES PATENT OFFICE.

ALPHONSO COMSTOCK PRATT, OF GLEN RIDGE, NEW JERSEY.

MILEAGE-INDICATOR FOR TIRES.

1,167,836.  Specification of Letters Patent.  Patented Jan. 11, 1916.

Application filed December 26, 1914. Serial No. 879,110.

*To all whom it may concern:*

Be it known that I, ALPHONSO COMSTOCK PRATT, a citizen of the United States, residing in Glen Ridge, county of Essex, State of New Jersey, have invented certain new and useful Improvements in Mileage-Indicators for Tires; and I do hereby declare the following to be a full, clear, and exact description of the invention, such as will enable others skilled in the art to which it appertains to make and use the same.

This invention is directed to the provision of a tire, such as those used on the wheels of automobiles, having devices combined therewith which will aid in determining to what extent the tire has been used.

In the sale of automobile tires, it is usual to guarantee a tire for a given mileage and to grant a reduction from the established price of a new tire commensurate with the extent to which an old one has fallen short of attaining the guaranteed mileage. In the operation of this selling plan, disputes as to the extent of use of an old tire have been quite common. Such disputes may be avoided by providing the tire with a mileage-indicator which is actuated in accordance with the extent of use of the tire, this indicator being incorporated in the structure of the tire so as to be normally inaccessible and made accessible only by rendering the tire unfit for further use. The present invention is directed to the provision of a tire provided with such a mileage-indicator, the indicator being of marked simplicity, capable of manufacture and installation in a tire at very low cost and adapted to give an indication of tire-mileage with a degree of accuracy sufficient for the purpose set forth. I employ as the indicating device a piece of metal or other suitable substance having a capacity to withstand flexure which, within certain limits, is predetermined. This characteristic of the material is utilized to obtain the desired indications by placing the device in such a position in a tire that it will be flexed repeatedly by the flexure of the tire resulting from its contact with the roadway. Such flexure of the indicator repeated with each revolution of the wheel results finally in fracture of the indicating device at one or more points, and the location of such fracture, or fractures, may serve as an index of the extent of use of the tire. Preferably, the indicator is in the form of a strip of sheet-metal which is homogeneous and of uniform quality throughout to a marked degree. This strip may be notched at various points along its length so that it is of varying cross-sectional area at the various points where it is notched. Such a strip placed in a tire will be flexed as the portion of the tire in which it is located is flexed by its contact with the roadway, and after being thus flexed a number of times falling within a predetermined range, it will fracture at the point where it is of the smallest cross-sectional area. If the tire be continued in use thereafter, the indicating strip will subsequently be fractured at the point of next lowest cross-sectional area, and so on. When the period of use of the tire is at an end, the indicator may be exposed and examined to determine the number and location of the fractures, and thus obtain an approximate indication of the mileage over which the tire has been used.

The features of my invention may be employed in indicating devices of various types and constructions. I have illustrated in the accompanying drawings the form in which I prefer to embody the invention.

In these drawings, Figure 1 is a sectional elevation of a tire provided with my improved form of tire-mileage indicator; Fig. 2 is a transverse section through the tire and the rim on which it is mounted; Fig. 3 is a plan view of the indicator strip; Fig. 4 is an edge view of the strip, and Fig. 5 is a view similar to Fig. 3 illustrating a slight modification of the construction shown in the other figures.

Referring to these drawings, an inflated pneumatic tire consisting of a shoe 7 and an inner tube 8 is shown mounted upon a wheel. The construction of the wheel and the parts employed for sustaining the tire and also the tire itself, except as concerns the indicator, may be of the usual or any suitable construction since these form no part of the present invention. The indicator device (or devices) is incorporated in the structure of the shoe of the tire. Such a shoe usually consists of an inner portion of rubber and fabric and an outer sheathing of rubber, a plurality of layers of fabric being employed extending over the tread of the inner portion of the tire as is shown at 9 in Fig. 2. The indicator device, or devices when a plurality of them are employed, is preferably located adjacent to the layers 9 of fabric or between certain of the layers. The indicator device consists of a strip 6 of sheet-metal. Preferably a high grade sheet steel is employed in the construction of this strip, the strip being prepared with great care in order to insure that it will be of a uniform texture throughout. This strip 6 is notched on one or both of its lateral edges, as shown at 12 in Fig. 3, so that it will be of varying cross-sectional area at the points where it is notched. Preferably it is notched on both of the opposite sides and the notches are of progressively increasing depth, as is indicated in Fig. 3. The steel strip thus made will flex readily with the portion of the shoe in which it is located, and by notching it in the manner described to predetermined depths it will have a predetermined capacity for withstanding flexure at each of the points where its cross-sectional area is diminished by the notches. Therefore the strip may be flexed a number of times predetermined within certain limits and will then be fractured at the point of smallest cross-sectional area. Thereafter, if the flexing of the strip be continued, the strip will be unaffected by such flexures until they have been repeated a number of times predetermined within certain limits, whereupon it will be fractured at the point of next lowest cross-sectional area.

The strip so made is incorporated in the structure of the shoe of a tire as shown in Figs. 1 and 2, so that it will be normally inaccessible, but may be rendered accessible by cutting away the adjacent portion of the shoe, whereupon the strip will be exposed but its exposure will be affected only by rendering the tire unfit for further use.

Preferably a plurality of the tire-milage indicators are provided in the same shoe. In Fig. 1 I have shown four of the indicators located within the shoe at equal distances apart. When a tire thus provided with the indicators is in use, the tread portion thereof is flexed by its contact with the roadway so that each of the several indicators is flexed every time the wheel makes one revolution. Since the indicator has a definite capacity for withstanding such flexures, it will not be affected thereby until it has been flexed a number of times predetermined within certain limits, whereupon it will break at the point where its width has been reduced the greatest amount by the notches. The continued use of the tire thereafter will result in fracturing each of the several indicators at one after another of the points where they have been notched.

By making the indicator strips of steel, steel alloy, or other suitable material of a sufficiently high degree of uniformity, and making the notches therein with such care as to insure that the strips will be of the desired width at the points where they are notched, it is possible to obtain approximate indications of the extent of use of the tire. Such indications may be utilized as a basis for figuring an adjustment as above outlined when a tire is claimed to have fallen short of attaining the guaranteed mileage.

In Fig. 5 I have shown a slight modification of the construction shown in Fig. 3. The extent to which an indicator strip such as that above described would be flexed would depend in a measure upon the pressure to which the tire had been inflated, so that if the pressure were abnormally low the greater extent of flexure of the indicator strips might result in causing fracture of the strips after being flexed a number of times less than that intended.

In order to indicate whether or not a tire has been utilized with an insufficient pressure therein, the indicator strips may be provided with lateral extensions 10 adapted to extend partially around the tire toward the rim on which it is supported. These extensions 10 may be notched as shown at 11 in the manner above described in connection with strip 6, the notches being of such depth as to result in fracture at one or more of the notches if the tire be used with insufficient pressure therein over a given distance.

Instead of varying the capacity of the indicator strips to withstand repeated flexure by notching the strips upon opposite sides to different depths, the same result may be attained by boring small holes in the strips, one hole at one point, two at another, three at another, and so on. This is indicated in Fig. 6 where three indicator strips are shown having different numbers of holes in them, the holes being in alinement transversely when two or more are employed.

Instead of so forming a single indicator strip that it will have different capacities for withstanding repeated flexure at different points thereon, I may provide a plurality of indicator strips each of which has a capacity for withstanding repeated flexure different from all of the others. Also, this difference of capacity may be attained by employing different materials in the several strips instead of making the several strips of different cross-sectional areas. In Fig. 7, three indicator strips are shown which are made from different materials and which, by reason of the difference in the materials employed, have different capacities for withstanding flexure without fracture. A plurality of such indicator strips of different materials would be incorporated in a shoe and after the period of use of the shoe had terminated, all of these strips would be examined to ascertain which of them had been fractured by the repeated flexing to which they were subjected in use.

I have described herein the embodiments of my invention which I prefer to employ, but I wish it understood that the invention is not limited to any specific construction. The several different forms to which I have referred as well as others which will be suggested by the disclosure contained herein, I consider within the scope of my invention and I aim to cover them by the terms of the claims appended hereto.

What I claim is:

1. A tire having a flexible member therein responsive to repetitions of flexures to give an indication of the extent of use of the tire; substantially as described.

2. A tire having a flexible member therein adapted to give an indication of the extent of use of the tire dependent upon the capacity of the member to withstand repeated flexures; substantially as described.

3. A tire having a flexible mileage-indicating member therein in position to be subjected to repeated flexures when the tire is in use; substantially as described.

4. A tire having a flexible member therein in position to flex with the tread portion of the tire when the tire is in use, and adapted to be affected in a prescribed manner by predetermined numbers of flexures to indicate the extent of use of the tire; substantially as described.

5. A tire having a flexible mileage-indicating member therein in position to be subjected to repeated flexures when the tire is in use, said member being capable of withstanding flexures to varying degrees at different points thereon; substantially as described.

6. A tire having an indicator therein adapted to give an indication of tire mileage by the point of fracture thereof; substantially as described.

7. A tire having a flexible mileage-indicating member therein of varying cross-sectional areas at different points thereon; substantially as described.

8. A tire having a flexible sheet-metal strip therein notched at points distributed along its length so as to be of varying widths at said notches; substantially as described.

9. A tire having a flexible indicating strip mounted therein and extending along the tread portion of the tire, said strip having a varying capacity to withstand flexures at different points along its length and lateral projections on the strip extending partially around the tire; substantially as described.

In testimony whereof I affix my signature in presence of two witnesses.

ALPHONSO COMSTOCK PRATT.

Witnesses:
ADA ASZMAN,
EDITH DANIEL.